(12) United States Patent
Burba

(10) Patent No.: US 12,172,129 B2
(45) Date of Patent: *Dec. 24, 2024

(54) MODULAR EXTRACTION APPARATUS

(71) Applicant: International Battery Metals, Ltd., Houston, TX (US)

(72) Inventor: John L. Burba, Houston, TX (US)

(73) Assignee: International Battery Metals, Ltd., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,415

(22) Filed: Jan. 12, 2024

(65) Prior Publication Data

US 2024/0139683 A1  May 2, 2024

Related U.S. Application Data

(63) Continuation of application No. 17/582,391, filed on Jan. 24, 2022, now Pat. No. 11,904,276, which is a
(Continued)

(51) Int. Cl.
  *B01D 15/10* (2006.01)
  *B01D 15/00* (2006.01)
  (Continued)

(52) U.S. Cl.
  CPC ............ *B01D 61/04* (2013.01); *B01D 15/00* (2013.01); *B01D 15/10* (2013.01); *B01D 61/025* (2013.01);
  (Continued)

(58) Field of Classification Search
  None
  See application file for complete search history.

(56) References Cited

U.S. PATENT DOCUMENTS 5,470,464 A * 11/1995 Priegnitz ............ B01D 15/1842
                                                              210/659
8,574,519 B2   11/2013 Harrison et al.
(Continued)

FOREIGN PATENT DOCUMENTS

AU    2011338904 B2   6/2012
WO    2012077610 A1   6/2012
(Continued)

OTHER PUBLICATIONS

Leenheer, J.A., Noyes, T.I., A Filtration and Column-Adsorbtion System for Onsite Concentration and Fractionation of Organic Substances from Large Volumes of Water, U.S. Geological Survey Water-Supply Paper 2230, 83-600048, 1984.
(Continued)

*Primary Examiner* — Bradley R Spies
*Assistant Examiner* — Jeannie McDermott
(74) *Attorney, Agent, or Firm* — NOVAK DRUCE CARROLL LLP

(57) ABSTRACT

Apparatuses and methods for extracting desired chemical species including, without limitation, lithium, specific lithium species, and/or other chemical compounds from input flows in a modular unit. The input flows may be raw materials in which lithium metal and/or lithium species are dissolved and/or extracted. The apparatuses and methods may include daisy chain flow through separate tanks, a column array, and/or combinations thereof.

20 Claims, 5 Drawing Sheets

Related U.S. Application Data continuation of application No. 16/171,109, filed on Oct. 25, 2018, now Pat. No. 11,229,880.

(60) Provisional application No. 62/577,554, filed on Oct. 26, 2017.

(51) Int. Cl.

| | |
|---|---|
| *B01D 61/02* | (2006.01) |
| *B01D 61/04* | (2006.01) |
| *B01D 61/24* | (2006.01) |
| *B01D 61/58* | (2006.01) |
| *B01J 20/02* | (2006.01) |
| *B01J 20/08* | (2006.01) |
| *B01J 20/10* | (2006.01) |
| *B01J 20/16* | (2006.01) |
| *B01J 20/26* | (2006.01) |
| *C01D 15/02* | (2006.01) |
| *C01D 15/08* | (2006.01) |
| *C02F 1/00* | (2023.01) |
| *C02F 1/28* | (2023.01) |
| *C02F 1/42* | (2023.01) |
| *C02F 1/44* | (2023.01) |
| *C22B 3/02* | (2006.01) |
| *C22B 3/24* | (2006.01) |
| *C22B 3/42* | (2006.01) |
| *C22B 26/12* | (2006.01) |
| *C25B 1/14* | (2006.01) |
| *C02F 101/10* | (2006.01) |
| *C22B 7/00* | (2006.01) |

(52) U.S. Cl.
CPC .......... *B01D 61/246* (2013.01); *B01D 61/58* (2013.01); *B01J 20/0281* (2013.01); *B01J 20/0292* (2013.01); *B01J 20/08* (2013.01); *B01J 20/10* (2013.01); *B01J 20/16* (2013.01); *B01J 20/262* (2013.01); *C01D 15/02* (2013.01); *C01D 15/08* (2013.01); *C02F 1/008* (2013.01); *C02F 1/281* (2013.01); *C02F 1/42* (2013.01); *C02F 1/441* (2013.01); *C22B 3/02* (2013.01); *C22B 3/24* (2013.01); *C22B 3/42* (2013.01); *C22B 26/12* (2013.01); *C25B 1/14* (2013.01); *B01D 2311/04* (2013.01); *B01D 2311/2626* (2013.01); *B01D 2313/54* (2013.01); *C02F 2101/10* (2013.01); *C22B 7/006* (2013.01)

(56) References Cited

U.S. PATENT DOCUMENTS

| | | | |
|---|---|---|---|
| 8,753,594 | B1 | 6/2014 | Burba et al. |
| 9,764,318 | B2 | 9/2017 | Harrison et al. |
| 11,229,880 | B2 | 1/2022 | Burba |
| 11,498,031 | B2 | 11/2022 | Burba et al. |
| 2011/0174739 | A1* | 7/2011 | Chung .................. C22B 26/12 |
| | | | 210/170.11 |
| 2015/0258501 | A1 | 9/2015 | Chung et al. |
| 2016/0161454 | A1 | 6/2016 | Jones et al. |
| 2017/0298475 | A1 | 10/2017 | Paranthaman et al. |
| 2018/0245180 | A1* | 8/2018 | Cheng ................ B01J 20/28004 |

FOREIGN PATENT DOCUMENTS

| | | |
|---|---|---|
| WO | 2015200473 A1 | 12/2015 |
| WO | 2016073007 A1 | 5/2016 |
| WO | 2017039724 A1 | 3/2017 |
| WO | 2019084311 A1 | 5/2019 |

OTHER PUBLICATIONS

Dow Water Solutions, Filmtec Reverse Osmosis Membranes, Technical Manual, 2015, https://vdocument.in/filmtec-tech-manual.html, Form No. 609-00071-0109, Oct. 10, 2015 (accessed May 24, 2021).

PCT International Search Report, Written Opinion of the International Searching Authority, International Preliminary Report on Patentability, PCT/US18/57578; Mar. 7, 2019.

Extended European Search Report dated Apr. 15, 2021 for EP Patent Application No. 18869704.9; 8 pages.

Communication pursuant to Article 94(3) EPC dated Apr. 4, 2022 for EP Patent Application No. 18869704.9; 6 pages.

Chilean Patent Office Examiner's Report No. 1 dated Feb. 14, 2022 for Chilean Patent Application No. 2020-001110; 16 pages.

Chilean Patent Office Examiner's Report No. 2 dated Jul. 20, 2022 for Chilean Patent Application No. 2020-001110; 13 pages.

PCT International Search Report, Written Opinion of the International Searching Authority, PCT/US22/21500; Oct. 26, 2022.

Xu, P. et al.; "Materials for Lithium Recovery from Salt Lake Brine"; Journal of Materials Science, Online; Springer Science+Business Media, LLC; Aug. 19, 2020; DOI: 10.1007/s10853-020-05019-1.

Examination Report No. 1, dated Jun. 30, 2023; issued in connection with Australian Appliation No. 2018354320.

* cited by examiner

MODULAR EXTRACTION APPARATUS

CROSS-REFERENCE TO RELATED APPLICATIONS

This application is a continuation of U.S. patent application Ser. No. 17/582,391, filed Jan. 24, 2022, which is a continuation of U.S. patent application Ser. No. 16/171,109, filed Oct. 25, 2018, which application claims the benefit of U.S. provisional patent application Ser. No. 62/577,554, filed Oct. 26, 2017, each of which application is incorporated herein by reference in its entirety.

FIELD

Aspects of the present disclosure generally relate to separation of materials, and more particularly to a modular extraction array for separation, purification, and/or concentration of various elements from brine solutions.

BACKGROUND

Reference may be made herein to other United States patents, foreign patents, and/or other technical references. Any reference made herein to other documents is an express incorporation by reference of the document so referenced in its entirety.

Recent advances in chemical processes allow for separation of species from raw materials. An element of interest is Lithium (Li), as lithium compounds are employed in various applications. For example, lithium stearate ($C_1sH_{35}LiO_2$) may be used in lubricants, lithium hydroxide (LiOH) is used in breathing gas purification systems for spacecraft, submarines, and rebreathers to remove carbon dioxide from exhaled gas, and lithium metal can be alloyed with other metals, e.g., aluminum, copper, manganese, and cadmium to make high performance alloys for aircraft and other applications. Lithium metal also has the highest specific heat of any solid element, so lithium may be used in heat transfer applications. Lithium ions are also used in rechargeable batteries for various devices.

Extraction and/or separation of lithium as a metal, or as a species, from raw material are often difficult and expensive. Separation of lithium or other metals from brine is often done at a separation facility, which may involve transportation of the brine to the facility, transportation of the desired constituent, whether in solid or in solution, from the facility, and/or a large capital investment in the facility construction and maintenance. Such facilities may also employ customized designs and/or equipment, and may also involve obtaining building permits or other government approvals before construction occurs, further adding to the overall costs of extraction of the desired constituent.

The present disclosure describes methods and apparatuses for separation of lithium and/or lithium species from raw materials.

SUMMARY

A modular extraction system in accordance with an aspect of the present disclosure comprises a first tank, a second tank, and a third tank, an interconnection system for selectively directing a brine input stream to at least one of the first tank, the second tank, and the third tank, an amount of sorbent material contained within at least one of the first tank, the second tank, and the third tank, in which the sorbent material extracts at least one constituent from the brine input stream, and at least one of a purification membrane and a concentration membrane, for processing the extracted at least one constituent into at least one output stream.

The above summary has outlined, rather broadly, some features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same or similar purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further features and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
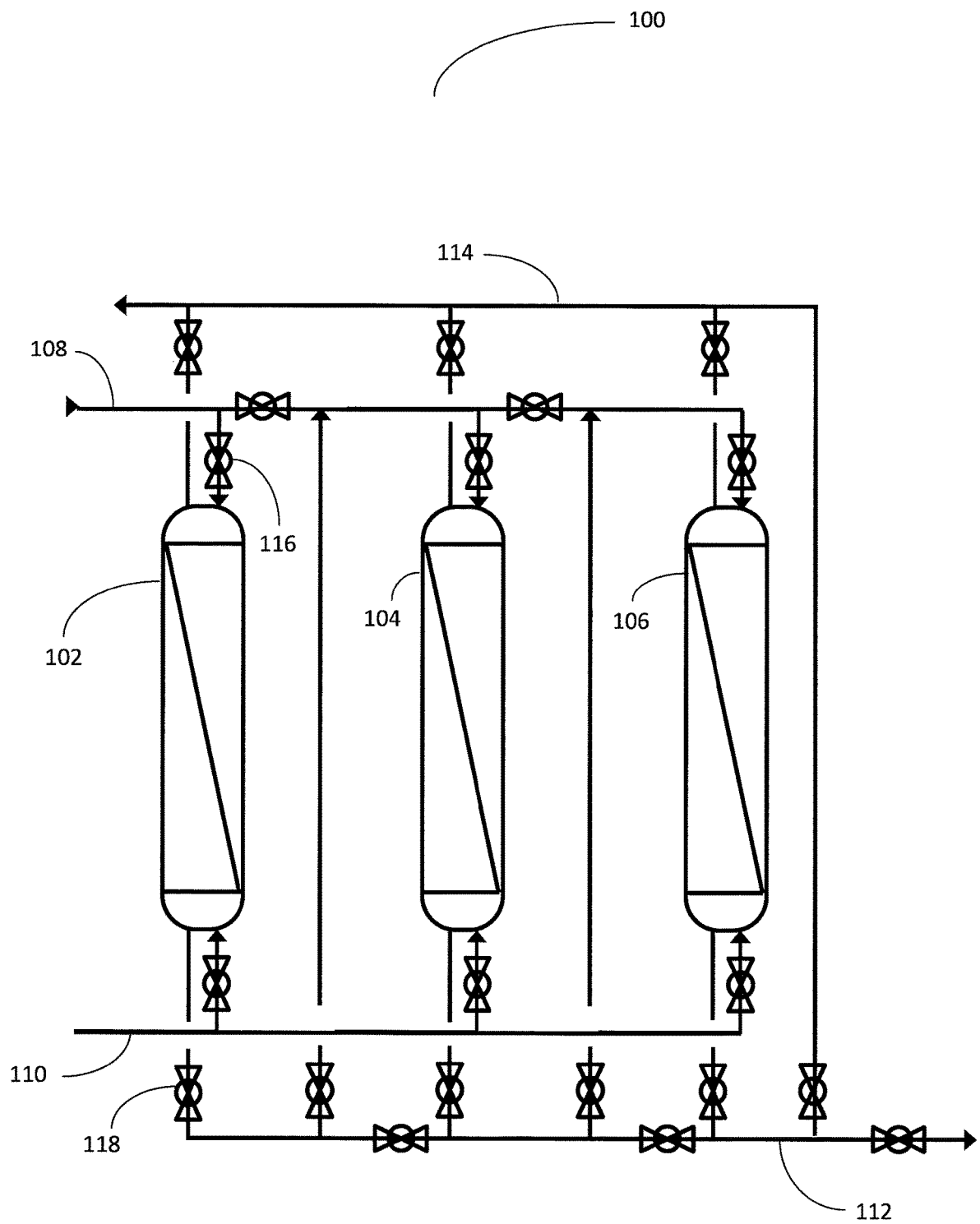
FIG. 1 is a process flow diagram for species separation in an aspect of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Although described herein with respect to lithium and/or lithium species, other elements and/or species, e.g., calcium and/or other alkaline earth metals, sodium and/or other alkali metals, etc., may be employed without departing from the scope of the present disclosure.

Overview

Other approaches have been undertaken to extract lithium, specific lithium species, and/or other chemical compounds from raw materials. The raw materials are directly exposed to solvents such as acids, and the lithium metal and/or lithium species are dissolved and/or extracted. With such approaches, however, large amounts of chemical by-products are produced, and disposal of such solvents may be expensive. Further, building such a plant usually involves a large capital investment, as well as many years to obtain governmental approval and to build.

In an aspect of the present disclosure, a mobile system may use single or multiple elements arranged in a single unit or multiple arrays for the extraction, purification, and concentration of lithium and other constituents from brine. Constituent species are targeted by arranging extraction columns, purification membranes, and/or concentration membranes in the mobile unit.

Conventional methods of separating lithium and/or other constituent species from solution, e.g., brine, etc. are often dependent upon specific sequences. The specific sequence, and design and/or operation of a separation plant, also may depend upon the variation within the brine stream. A common approach for separation is to flow the brine stream through an adsorbed material. The adsorber material is usually packed into a column, called a "packed bed" column, where the species of interest is selectively adsorbed onto the internal packing of the packed bed column. A sequence of fluid flows may be used to minimize impurities and maximize concentration of the targeted constituent for isolation.

Performance of conventional systems is limited by the ability to increase the concentration of the targeted constituent and decrease concentration of the undesired impurities. Brine streams that have low concentrations of the targeted constituent are recycled through conventional systems, thus creating very specific sequences and column arrangements and involve large volume internal components and flow. The materials in the columns, e.g., sorbent particles, sorbent fibers, separation membranes, plates, and other known separation materials must be arranged in conventional systems to maintain a distinct difference in the concentration of the stream flowing through the columns in order to enable the mass transfer of the targeted constituent to the internals.

As an example of the conventional approach, brine is flowed through a packed bed column having sorbent material for adsorption of the targeted constituent lithium. The column may be 10 feet in diameter and 30 feet high. As the brine flows through the packed bed column, the lithium in the brine is adsorbed at extraction "sites" on the sorbent material. Brine is flowed through the packed bed column until the sorbent material is saturated with lithium, i.e., where all or nearly all of the extraction sites of the sorbent material are filled with lithium. A second stream is then flowed through the packed bed column to displace the residual brine from the initial flow. This second stream lowers the concentration of impurities present in the brine, i.e., the non-targeted constituents of the brine. A third flow, known as "product flow" is then passed through the packed bed column. The product flow detaches the lithium (and/or other targeted constituent) from the sorbent material. The sequence duration and specific makeups of each of these flows (or "streams") determine the performance of the column.

When the brine is flowed through initially, the sorbent material may not remove all of the targeted constituent. This may necessitate flowing the brine through the packed bed column many times to ensure that as much of the targeted constituent is removed as possible. However, this may interfere with the initial flow, dilute the initial flow, etc., and thus uses extra volume in the packed bed column, more precise control of the system, etc.

In an aspect of the present disclosure, a simplified column and/or simplified column sequence may reduce the volume, dynamic shock on the internals, and/or employ post column concentration to simplify system design and/or operation. In an aspect of the present disclosure, the system may be mobile, in that a system may be placed on a truck or be on a mobile platform (also known as a "skid") such that the system may be placed in locations where conventional systems would be difficult to locate.

In an aspect of the present disclosure, and as described in U.S. Patent Application No. 62/394,117, which application and priority is wholly incorporated by reference herein, a stream containing a concentration of lithium or another targeted constituent may be fed into an array of smaller diameter columns, e.g., a plurality of one foot diameter columns each five feet high, with a flow controller to balance the flow through each column in the array. It is envisioned that various diameters and various heights of columns are within the scope of the present disclosure, e.g., such that the ratio of diameter to height is in the range of approximately 2 to 10, and the diameter is on the order of one fifth to one twentieth the diameter of conventional columns. A single column may be employed within the scope of the present disclosure if desired. So long as the column within the system maintains the mobility of the system, any size column or any number of columns may be employed without departing from the scope of the present disclosure.

In an aspect of the present disclosure, instead of feeding an entire stream of fluid containing a concentration of lithium or another targeted constituent into a single large diameter, lengthy column, the stream may be divided into portions and one or more of the portions may each be fed into smaller diameter and/or shorter length columns. By dividing the incoming stream into smaller portions, each column can be better controlled for pressure drops, pressure surges, etc. to reduce the effects of pressure changes on the sorbent in each column. A flow controller may be used to balance the fluid flow through each column. The smaller (in length and/or width) columns may each perform one phase or processing step in the overall system, and each of these columns may be placed in series (called a "daisy chain"). By placing two or more daisy chains in parallel, the entire incoming fluid flow may be processed. Similarly, a plurality of columns may receive the entire incoming flow for step/phase one of the process (called a "cluster of columns") and the output of that cluster may be collected together and passed to the next step/phase of the overall process being performed. This parallel connection of columns as clusters for each of the phases/steps of the process may also be combined in any form with the daisy chain configuration without departing from the scope of the present disclosure. Further, a single column may be employed within the scope of the present disclosure if desired. So long as the column within the system maintains the mobility of the system, any size column or any number of columns may be employed without departing from the scope of the present disclosure.

By placing a parallel feed manifold on top of the packed bed columns, the flows through each column may be adjusted, either manually or automatically, to distribute the flow between the columns present. Regardless of the number of columns present, the system "behaves" as if the columns are a single column. This arrangement allows for a sharp concentration profile, also known as a sharp "brine-water interface", to be presented to the extracting material in each of the columns. A sharp brine-water interface means that the physical boundary of the concentration of the constituents of interest on one side of the boundary remain separate and evenly distributed along the boundary as the profile flows axially down the bed of sorbent in the column. A sharp concentration profile is contrasted with a maldistributed or back-mixed profile which gradually destroys the sharp contrast at the boundary between the two concentrations. A profile that is not chromatographic also is physically much wider in the axial direction and along the axial plane, as sampling in the wider boundary area is gradual where the two ends of the wide boundary layer are the same as the concentrations on either side of the widened boundary layer.

Although a system in accordance with the present disclosure may not allow for more complex flow sequencing, the ability of the system to remove and replace columns may reduce complex flow sequencing in a mobile unit. Further, the mobile aspects of such a system may allow for simpler extraction techniques at remote locations.

Further, systems in accordance with aspects of the present disclosure reduces the dynamics, vibrations, and interactions that are present in conventional systems. Systems in accordance with the present disclosure may be operated at lower pressures, and with shorter columns may be subject to reduced recycling of brine. Other aspects of the present disclosure may also reduce the wear on system hardware and sorbent components.

For example, the sorbent material to capture lithium is a "size exclusion" material that creates extraction sites only lithium ions/atoms can fit into. This sorbent may be one or more lithium aluminates. The lithium aluminates may have large surface areas having sites that accept only ions that are of a certain size, e.g., lithium ions, and attract the lithium ions into the sites through energy loss of the lithium ion as the fluid flows through the column. The sorbent is then formed into a structurally stable particle and placed in the column as a packed bed. This material may be more susceptible to damage due to hydraulic dynamics, e.g., pressure drops across the column, pressure surge ("water hammer") effects as fluid flow is increased and/or reduced through the column, etc., during fluid flow than other types of sorbents, e.g., ion exchange resins.

The sorbent material may be a solid material and/or a liquid material, and may comprise one or more of lithium aluminate, aluminum-based material, aluminum-oxygen based materials, manganese, manganese oxides, gallium-based materials, cobalt oxides, transition metal oxides, transition metal sulfides, transition metal phosphates, aluminum phosphates, gallium phosphates, antimony oxides, antimony phosphates, tin oxides, tin phosphates, silicon-based materials, germanium-based materials, transition metal silicates, aluminum-gallium silicates, germanium, tin, and/or antimony silicates, sulfides, titanates, indiumates, indium tin oxides, mixed transition metal oxides and/or phosphates, organophosphates, polymers containing organophosphates, polyethers, ion-exchange resins, bohemite-based materials, aluminum-oxyhydroxides, activated alumina, and/or other materials that adsorb a desired constituent in the brine.

Aspects of the present disclosure reduce problems associated with the brittle and friable nature of the lithium aluminate(s) in lithium extraction applications. With wider and taller sorbent tanks, the sorbent particles are subjected to pressure drops and/or pressure surges that stress the sorbent particles. Additional pressure forces the sorbent particles to become more closely packed, and as the pressure in the tank changes, friction between the particles abrades the particles, which may reduce the number of attraction sites on each sorbent particle. A fewer number of attraction (absorption) sites in the same volume of a column reduces the efficiency of the column. Pressure surges create similar effects with respect to abrasion/friction of the sorbent particles within the column.

In accordance with an aspect of the present disclosure, a shorter column may be subject to a lower amount of pressure drop across the length of the column, thereby reducing the chance of abrasion/friction between the particles. Further, a smaller diameter column may be easier to control the pressure changes/surges across the diameter of the column, thereby increasing the sharpness of the brine-water interface within each column. By tighter control of the brine-water interface, the efficiency of the overall system may increase. The lower pressure drop reduces the grinding and allows much more capacity of the system, while increased pressure also increases sorbent particle attrition. This in turn increases internal useful life and allows for continued lower cost operation.

Daisy Chain Flow

FIG. 1 illustrates a flow system of the related art.

System 100 illustrates tank 102, tank 104, and tank 106 that are connected to a forward flow feed line 108 and a reverse flow feed line 110. The tanks 102-106 are also connected to a forward flow discharge line 112 and a reverse flow discharge line 114. The control of the flow through tanks 102-106 can be performed by valves coupled to tanks 102-106 as shown in FIG. 1, or may be performed by other means without departing from the scope of the present disclosure. Each tank 102-106 contains a sorbent material as described herein.

System 100 may be referred to as a "lead/lag/regen" system 100, in that tank 102 is the first tank to receive fluid flow through forward flow feed line 108, tank 104 may be the second tank to receive fluid flow through forward flow feed line 108, and tank 106 may be the third tank to receive fluid flow through forward flow feed line 108. As such, tank 102 may be referred to as the "lead tank 102," tank 104 may be referred to as the "lag tank 104," and tank 106 may be referred to as the "regen tank 106" herein for ease of following the description of this aspect of the present disclosure.

The present disclosure may be operated in several different modes. Once the fluid containing the desired constituent (also referred to as "brine" herein) is introduced to tank 102 by opening valves 116 and 118, sorbent material in tank 102 begins to absorb constituents in the brine. In the case of lithium-containing brine, the lithium ions are attracted to water molecules in the fluid by the lone pairs of electrons in water molecules. As the lithium ions in the fluid pass near the sorbent absorbing sites, the lithium loses energy by shedding the water molecules and enters the absorbing site. In another aspect of the present disclosure, an ion-exchange resin may be used where the lithium (or other constituent) ion is exchanged with an ion that is currently attached to the resin, where the exchange also results in a lower energy state for the constituent ion and/or energy state of the resin. Other absorption techniques are also possible without departing from the scope of the present disclosure.

As a fluid containing the desired constituent (also referred to as "brine" herein) flows from 108 to 102, valve 116 and valve 118 are opened to allow for brine flow through 102. Brine fluid from 108 is allowed to flow through 102 until sorbent material in 102 has started absorbing the desired constituent, and may near saturation, with a desired constituent in the brine fluid from 108.

When the desired concentration of constituent has been absorbed by the sorbent, a second fluid flow (which may emanate from valve 108 and/or 110) is introduced into tank 102. This second fluid flow may be water. As the second fluid flow begins to move through tank 102, the interface between the brine and the second fluid (the brine-water interface) moves along the length of the tank 102. As the interface passes a given level in the tank 102, the ions that have been captured in the sorbent may also lose energy by leaving the absorption site and entering the fluid stream in the second fluid. In the case of lithium, the lithium ion is attracted to several water molecules in the second fluid, which would place the lithium ion at a lower energy state in the second fluid than if the lithium ion were to remain absorbed (attached) to the sorbent particle. As such, the lithium is "flushed" or removed from the sorbent and is absorbed by the second fluid.

In another aspect of the present disclosure, once sorbent material in tank 102 has been completely saturated, a second ("dilute") flow is introduced into tank 102. This dilute flow may come from 108 or from 110. The dilute flow may comprise a dilute solution of the desired constituent dissolved in water, and forces the remaining brine (and all of the impurities still present in the brine) from tank 102 while at least partially filling tank 102. By maintaining a substantially constant pressure within tank 102, the structural integrity of the sorbent material in tank 102 is relatively maintained. The removal of the brine fluid may reduce the impurities that are present when the desired constituent is removed from tank 102. While tank 102 is being filled with the dilute flow, lag tank 104 may be being filled with brine flow from 108. Thus, tank 102 "leads" the flow ahead of lag tank 104. Other valves and/or other mechanisms in system 100 may control the flow of brine and/or dilute flow into tanks 102-106.

Once lead tank 102 has been filled with the dilute flow, a stripping solution is placed into tank 102 to remove the desired constituent from the sorbent material in tank 102. This flow may also come from 108 or from 110, and regenerates the ability of tank 102 to absorb the desired constituent from a brine fluid flow.

As such, while lead tank 102 is absorbing the desired constituent from the brine flow, lag tank 104 may be undergoing a dilute flow and regen tank 106 may be receiving the stripping solution to remove the desired constituent from the sorbent material. Thus, system 100 may be operated as a continuous sequential flow system, such that the brine flow from 108 is continuously flowing into one of tanks 102-106 and the desired constituent is continuously being removed from another of tanks 102-106 once an initial cycle through the number of tanks 102-106 has been completed. Such a sequential flow system 100 may also be referred to as a "daisy chain" flow system.

Column Array Description

Figure 2:
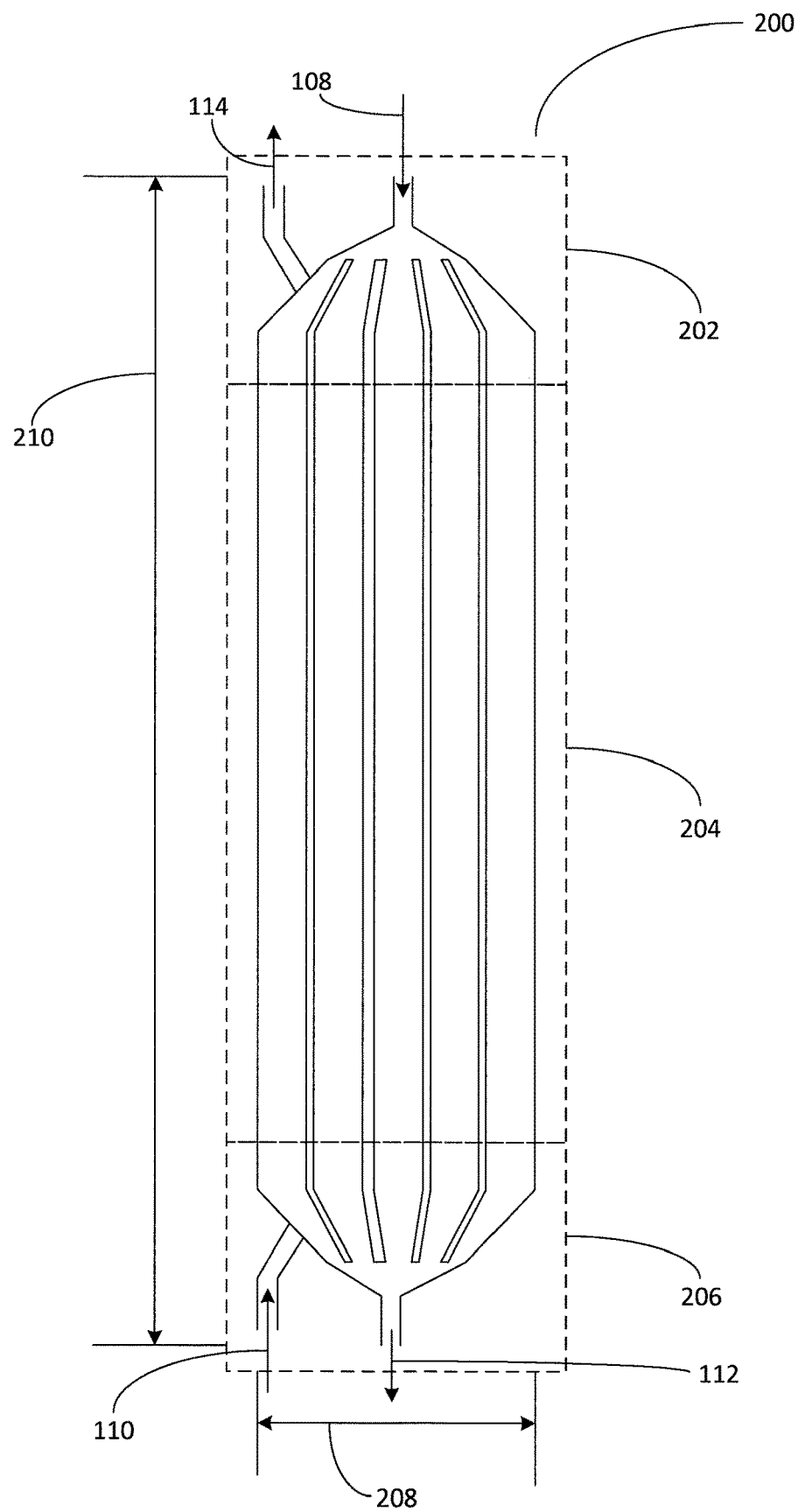
FIG. 2 illustrates a column array in accordance with an aspect of the present disclosure.

FIG. 2 illustrates a column array in accordance with an aspect of the present disclosure.

In the related art approach, tanks 102-106 are large diameter tanks with a large height. The majority of the volume of tanks 102-106 in the related art is filled with sorbent material, which is packed into tanks 102-106 with pressure. Such tanks 102-106 are expensive to build, maintain, and often employ specially-built facilities to house.

In an aspect of the present disclosure, array 200, which may replace one or more of tanks 102-106 as shown in FIG. 1, comprise a first manifold 202, a plurality of columns 204, and a second manifold 206.

In an aspect of the present disclosure, manifold 202 distributes 108 and/or manifold 206 distributes 110 through columns 204, depending on the flow through columns 204.

By separating tank 102 (and/or tanks 104-106) into columns, the size and/or dimensions of the diameter 208 and/or the length 210 of array 200 may be sized such that array 200 can be mounted on a mobile (i.e., movable) platform.

The volume of fluid that takes up the space of one array 200 is called a bed volume. The extraction array 200, in combination with optional purification and concentration membrane units makes use of a simplified sequence that increases the collected mass of the target constituent. At saturation the targeted constituent concentration on the sorbent material is at its peak and the liquid in the column contains one bed volume of loading, or feed, solution worth of impurities.

At saturation in the conventional method the residual impurity liquid bed volume is displaced with a dilute stream, e.g., a lower concentration of the targeted constituent than the stream is displacing, and the residual impurity liquid bed volume is sent to spent solution, e.g., a solution where the target constituent has been removed to the greatest extent possible. Next the bed volume of dilute stream is displaced with a bed volume of clean stream, e.g., a stream containing substantially only desired constituents which are primarily the targeted constituents and the majority of the undesired constituents have been removed, containing a part per million concentration of targeted constituent also known as strip solution.

In the present disclosure, a similar flow sequence occurs for the brine and the dilute stream, i.e., brine is flowed through the column until the column has absorbed the targeted constituent, and a bed volume of diluted stream is flowed through the array 200. In the conventional method the bed volume of displaced dilute stream is either recycled or sent to spent solution so as not to dilute the concentrated target constituent stream that will be stripped from the sorbent material. In an aspect of the present disclosure the bed volume of displaced dilute stream can be recycled or pushed forward to the purification and concentration membrane units because the units can readily concentrate dilute and clean target constituent streams.

In an aspect of the present disclosure, depending on efficiency of the sorbent material and/or other economically-based factors, a number of bed volumes of strip solution may be flowed through the columns resulting in a higher mass of collected targeted material. This material will be relatively clean of impurities, but may be more dilute. A system in accordance with an aspect of the present disclosure can accommodate a more dilute flow once the targeted constituent has been removed from the sorbent material, because systems in accordance with an aspect of the present disclosure employs a concentration membrane unit.

Additionally, in the present disclosure the extraction material sites in the array 200 are more available than the conventional method because more of the targeted constituent was released, or stripped, from the extraction material sites as a result of the additional bed volumes of strip solution run through the array 200.

Once array 200 has been more thoroughly stripped, a system in accordance with an aspect of the present disclosure has a greater number of extraction sites available to attract the targeted constituent than a conventional system. Thus, a greater number of bed volumes can be flowed through the array 200 than a tank 102-106 in the conventional system. Because systems in accordance with the present disclosure may operate without recirculating loads, such systems may operate on a simpler time-based flow sequence, reducing complex valve and circulation designs employed by conventional systems.

System Description

Figure 3:
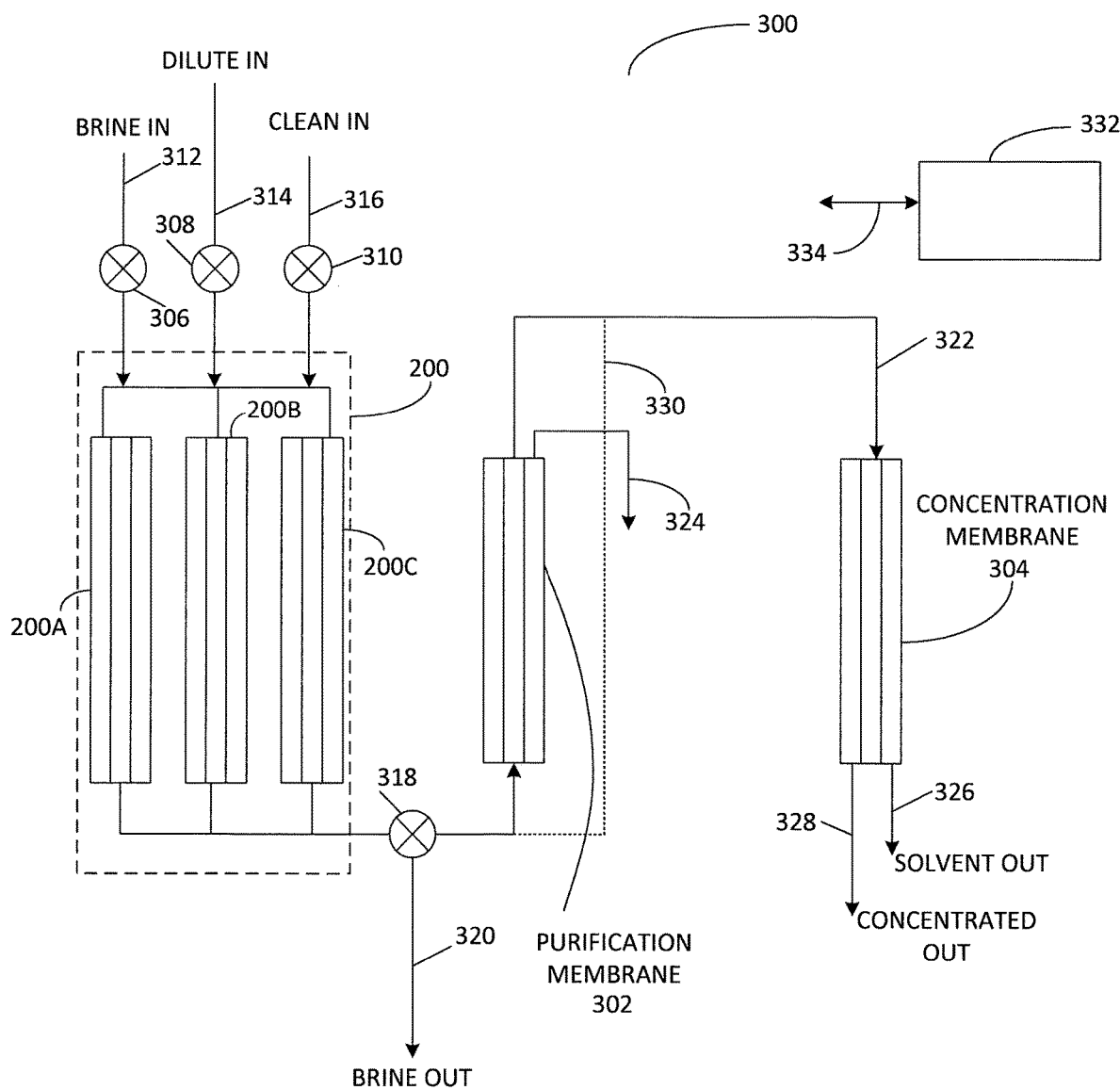
FIG. 3 illustrates a system in accordance with an aspect of the present disclosure.

FIG. 3 illustrates a system in accordance with an aspect of the present disclosure.

In an aspect of the present disclosure, the output of array 200 may be purified, e.g., have contaminants removed from the output stream from array 200, and may also be concentrated in the system with a concentration membrane.

A purification membrane, e.g., a cross-flow membrane, an ion-exchange resin, solvent extraction system, and/or other purification devices, allows the targeted constituent and solvent to pass, or permeate, while retaining or preventing undesired impurities from passing through the purification membrane and/or ion-exchange resin. Purification membranes, which may also be a nanofiltration membrane, or other type of filtration membrane, having a porosity and/or separation affinity for specific constituents in the output of array 200, and may reduce the levels of impurities to the parts per million levels. Purification membranes may be operated at a pressure between 100 and 400 psig. Ion-exchange resins may be employed to remove polyvalent metal ions, sulfates, borates, and/or other impurities as desired.

The concentration membrane may separate and/or remove the solvent, in most cases water, from the stream containing the desired constituent. Concentration membranes may be susceptible to impurity materials affecting the performance of the separation. In an aspect of the present disclosure, a purification membrane, such as a cross-flow membrane may be used prior to the concentration membrane to reduce the effects of impurities on the system.

A concentration membrane in accordance with an aspect of the present disclosure then accepts the product stream that passed through the purification membrane. The solvent passes through the concentration membrane and the target constituent is rejected and/or retained by the concentration membrane. In an aspect of the present disclosure, a reverse osmosis (RO) unit may be employed as a concentrating membrane. Concentration membranes operated as reverse osmosis systems may concentrate the targeted constituent to weight percentage levels. Concentration membranes operated as reverse osmosis systems may be limited by the osmotic pressure of the solution and the practical limits of the pressure ratings of the single element components. Concentration membranes may operate between 200 and 1200 psig. The concentration membrane may also be a heating system that boils off some of the liquid in the product stream, as well as an evaporative system that may or may not recover some of the evaporated liquid. For example, and not by way of limitation, the concentration membrane may be an evaporation pond, a boiler system, an evaporative cooler, and/or other systems that concentrate the amount of desired constituent in the product stream.

Both the purification membrane units and the concentration membrane units may be made up of single elements arranged in arrays. Similar to the extraction array, purification and concentration membrane units can be arranged in arrays and fitted to mobile systems. This allows the mobile deployment of these unit operations for recovery of targeted constituents.

The present disclosure may also isolate other targeted constituents. For example, and not by way of limitation, a system in accordance with the present disclosure may isolate CO2 from a feed gas stream. The CO2 may be used to produce the final Li2CO3 product by reacting the lithium rich brine stream with the separated CO2. In the case of LiOH production, the raw purification and concentration system allows the direct feed to a lithium hydroxide electrolysis system. The purified product will meet the raw purification standards and the system may only employ the secondary purification system to prepare the brine for electrolysis to LiOH. In both these product cases, lithium is the targeted constituent, but other elements may behave in a similar fashion and be targeted in accordance with the present disclosure.

System 300 comprises arrays 200A-200C, collectively referred to as array 200, arranged in a daisy chain configuration as shown in FIG. 1. The intermediate valves and reverse flow path through array 200 is not shown in FIG. 3 to aid in the understanding of system 300 in accordance with various aspects of the present disclosure. System 300 also comprises a purification membrane 302 (and/or ion-exchange resin), which may be an array similar to that described with respect to FIG. 2, and a concentration membrane 304, which also may be an array similar to that described with respect to FIG. 2. Valves 306-310 couple one or more inputs 312-316 to the arrays 200A-200C. Valves 306-310 may also control the flow and/or flow rate of the inputs 110-114.

Valve 318, which may be an array of valves, controls the flow out from arrays 200A-200C to direct the flow toward purification membrane 302 or as an output 320. Output 320 may be recycled to one or more inputs 312-316 and/or to one or more tanks 200A-200C if desired.

One output 322 of purification membrane 302 is passed to concentration membrane 304. Another output 324 of purification membrane 302 may exit system 300, or may be recycled back to one or more inputs 312-316. One concentration membrane 304 output 326 may exit system 300, while a second output 328 may be recycled back to one or more inputs 312-316. The volume ("bed volume") of arrays 200A-200C is known and/or may be calculated, and the flow rate of inputs 312-316 can be measured by a flow rate meter or other methods.

In an aspect of the present disclosure, system 300 may be operated as follows. Initially, valve 306 is opened and valves 308-310 are closed. As such, input 312, also referred to as brine input 312, is allowed to flow through array 200 (as one or more of arrays 200A-200C).

Brine input 312 may be analyzed to determine the concentration of the desired constituent (e.g., lithium, etc.) as well as other impurities (e.g., magnesium, silica, etc.) to determine how long to flow brine input 312 through array 200. Brine input 312 may be flowed through array 200 until one of the arrays (e.g., array 200A) array is approximately saturated with the desired constituent. Brine input 312 may then be directed toward another array (e.g., array 200B) within array 200. Output 320 may be recycled to input 312 if desired.

Once a portion of the array 200 (e.g., array 200A) is saturated with the desired constituent, the flow of brine input 312 is stopped to that portion of array 200 and valve 308 is opened to allow a second flow, called the "dilute flow," "dilute input" or "dilute stream," to flow into the saturated portion of array 200, such that the dilute flow displaces the remaining brine in the saturated portion of array 200. This displacement reduces the particulates and/or other impurities that may be captured by the purification membrane 302, while minimizing the removal of the desired constituent from the array 200.

As with brine input 312, the flow rate of dilute input 314 may be measured such that a bed volume, multiple bed volumes, and/or some other desired amount, of dilute input 314 is flowed through the desired portion of the array 200. Dilute input 314 may be passed through purification membrane 302 or be directed to output 320 as desired by changing the position of valve 318. Further, the position of valve 318 may be changed during the dilute input 314 flow to reduce any losses of desired constituent that may be dislodged from array 200 during the dilute input 314 flow.

Now that a portion of array 200 is saturated with the desired constituent, and the dilute input 314 has displaced the brine input 312 in that portion of array 200, valve 310 is opened and valve 318 is positioned to pass flow from array 200 to purification membrane 302. This flow, called the clean flow or clean input 316, removes the desired constituent from array 200 and passes the desired constituent in solution to purification membrane 302 and subsequently to concentration membrane 304.

For some systems 100, purification membrane 302 may not be necessary, because once the brine input 312 is displaced by dilute input 314, only the desired constituent, or a small enough amount of impurities, would remain in the flow that is passed through valve 318, and, as such, the flow may be directed into flow 322 and concentration membrane 304 as shown by dashed line 330 rather than through purification membrane 304. The output 324 from purification membrane 302 may be a concentrated flow of impurities removed from brine input 312. This output 324 may be sent to a similar system 300 that removes selected impurities from output 324 if desired, which may be accomplished by using a different sorbent material and/or ion-exchange resin in array 200. Other uses for output 324 are also envisioned as within the scope of the present disclosure.

The clean input 316 removes the desired constituent from array 200 in solution. This solution is then flowed through purification membrane 302 to remove impurities from the solution prior to the output 322. Output 322 is then flowed through concentration membrane 304 to remove the desired constituent from the flow 322 as a concentrated output 328, and the solvent is removed as output 326.

System 300 may also include processor 332, which is coupled to various valves, input streams, and/or other sensors via connection 334 within system 300 to control the flow of the various input streams 312-316 and outputs 320, 324, 326, and/or 328.

Further, system 300 may have a backflush capability for one or more of array 200, purification membrane 302, and/or concentration membrane 304. Backflushing one or more portions of system 300 may be performed by valves similar to those shown for the reverse flow path in FIG. 1, such that fluid may flow in a different direction than the flow from inputs 312-316.

Modular Platform System

Figure 4:
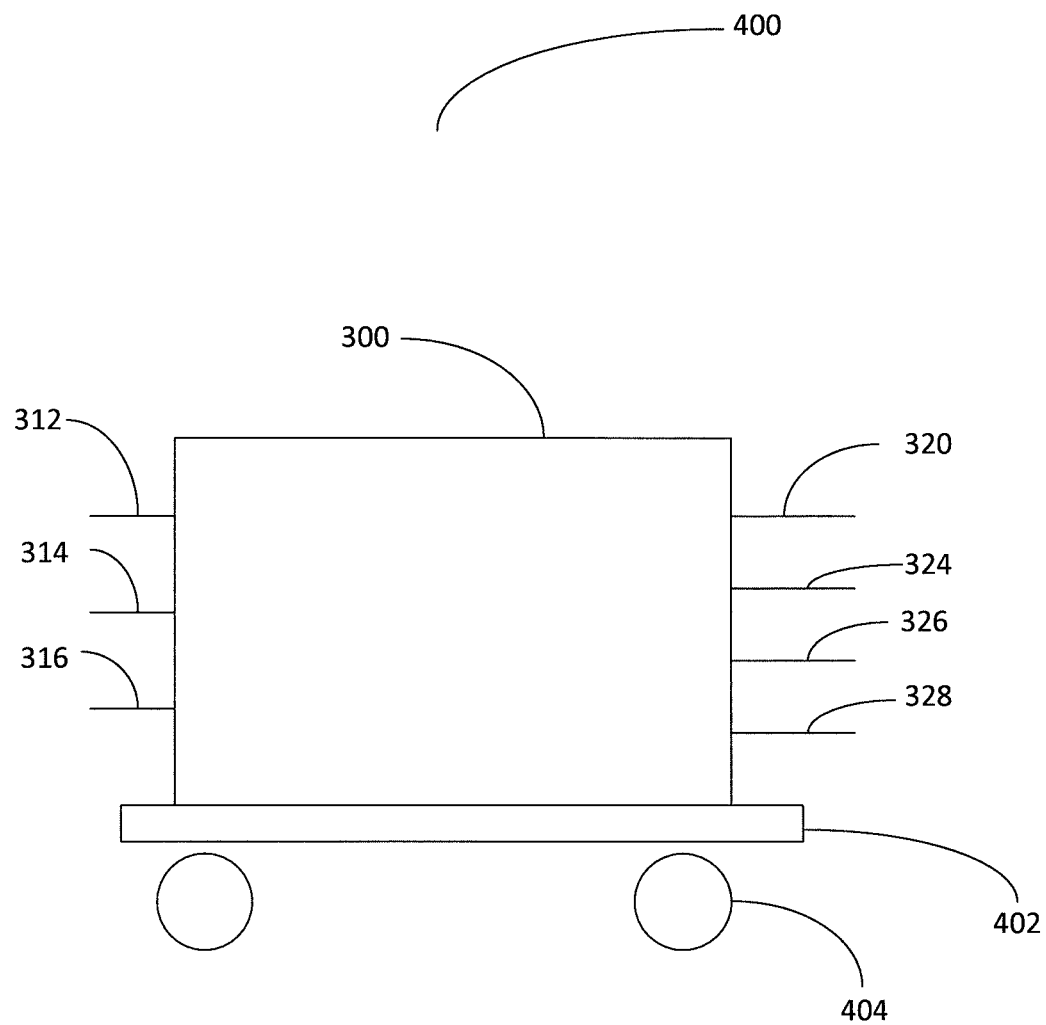
FIG. 4 illustrates a modular system in accordance with an aspect of the present disclosure.

FIG. 4 illustrates a modular system in accordance with an aspect of the present disclosure.

System 400 may include system 300, with inputs 312-316 and outputs 320, 324, 326, and/or 328 mounted on a platform 402. Platform 402 may be a mobile platform, and as such may include wheels 404 (and/or placed on wheels 404) if desired, or may be a skid platform 402, e.g., where a skid is a welded metal frame. Because the size of array 200 may be smaller than tanks 102-106, system 300 may be mounted on platform 404 and moved from location to location where input stream 312 is available, rather than shipping or flowing input stream 312 via pipeline to a remote location. For example, and not by way of limitation, system 400 may be employed in an oilfield with distributed well heads, in locations where runoff water from oil drilling operations is accessible, or in other locations where a mobile system 400 may be brought in for temporary use, without the need for building permits or other governmental approvals.

If desired, the outputs 320, 324, 326 and/or 328 may be taken from system 400 by tanker truck and/or other transportation to a location geographically distant from system 400, such that additional processing may be undertaken.

Although described with respect to a desired constituent, system 300 and/or 400 may be employed to remove an "undesired" constituent from input stream 312. For example, and not by way of limitation, system 300 and/or 400 may be used to remove a contaminant from input stream, such as contaminants from a water stream, to provide purified water as an output and removing unwanted constituents in the output 326 flow. System 300 may be connected in series and/or parallel with other systems 300, and may also remove both desired and undesired constituents from input stream 312 as desired without departing from the scope of the present disclosure.

Figure 5:
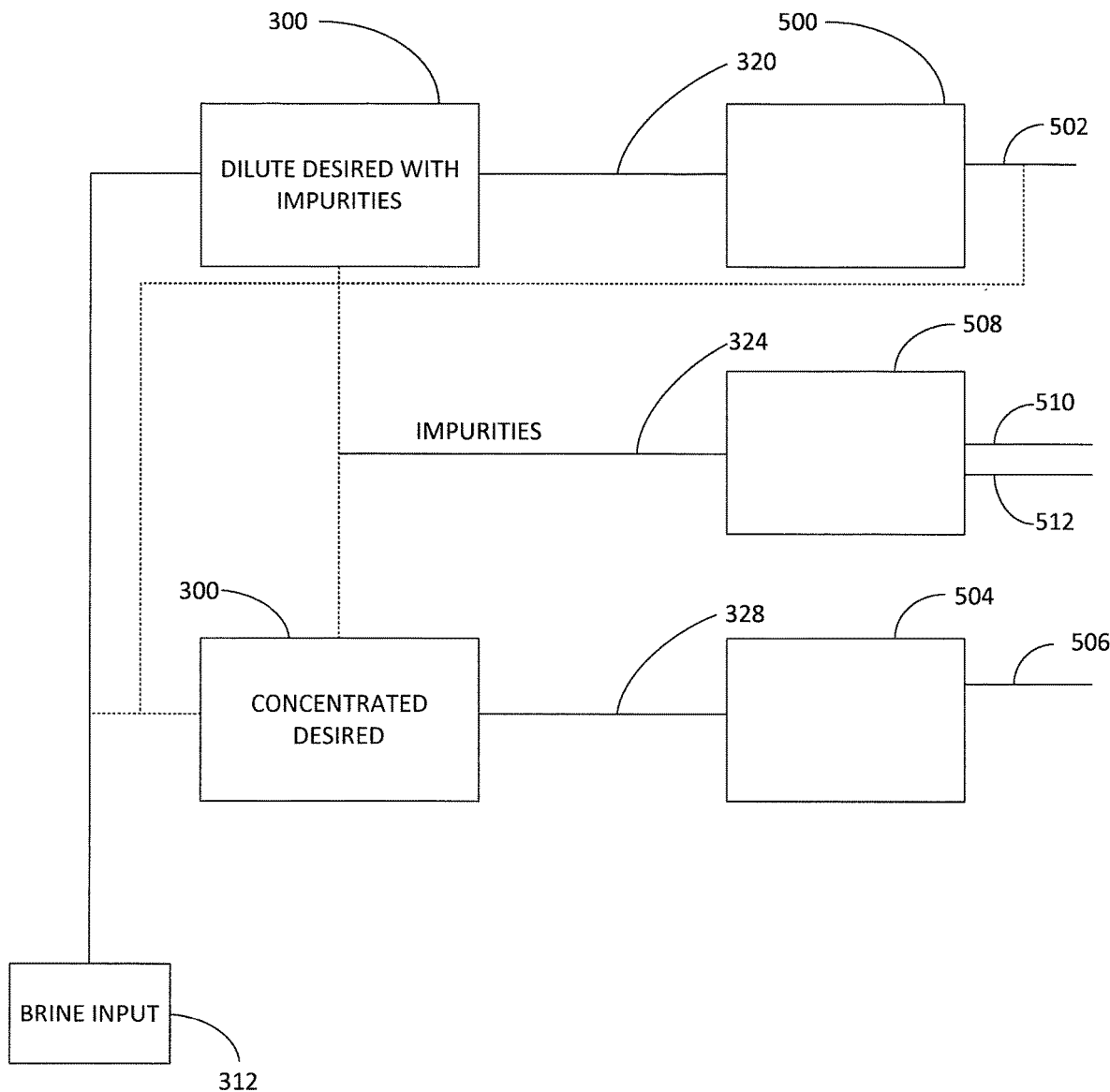
FIG. 5 illustrates a modular extraction apparatus in accordance with an aspect of the present disclosure.

FIG. 5 illustrates a modular extraction apparatus in accordance with an aspect of the present disclosure.

As described with respect to FIG. 4, system 300 (and/or system 400) may have one or more outputs 320, 324, and/or 328. Output 320 may be a diluted output of a desired constituent where the output stream contains impurities. Output 324 may be a stream of fluid that contains the removed impurities from the brine input stream 312. Output 328 may be a concentrated fluid flow of the desired input that has been concentrated through evaporation and/or other methods, and may also have impurities removed prior to exiting system 300.

In an aspect of the present disclosure, some systems may only have one output, or may have many outputs as described with respect to FIG. 4. Further, depending on the desired constituent and/or impurities present in brine input stream 312, different processes may be desired as part of an overall modular system design.

Module 500, which may be referred to as a "post-processing module" herein, may be a purification module that further removes impurities from output 320. Module 500 may also concentrate output 320. Depending on the design of module 500, output 502 may be a concentrated, relatively pure output stream comprising the desired constituent. For example, and not by way of limitation, brine input stream 312 may have a lithium concentration of 100 parts per million (PPM) and concentrations of divalent cations (magnesium, calcium, etc.) in the range of 10,000 PPM. System 300 may be designed, for various reasons, to produce an output stream 320 of 4% by weight (wt %) lithium having a 500 PPM concentration of magnesium and a 500 PPM concentration of calcium.

Transporting this output 320 (4 wt % Li, 500 PPM Mg++ and Ca++ as described in the example) long distances for purification and concentration may be impractical and/or cost prohibitive if the brine source 312 is relatively inaccessible. However, in some situations, transporting such an output 320 may be fairly straightforward via pipeline and/or other transportation methods. As such, in an aspect of the present disclosure, module 500, which may also be a mobile module, may be placed in relative proximity to module 300, such that output 502 may be a more concentrated output of lithium, e.g., 40 wt %, with reduced levels of magnesium and/or calcium, e.g., 50 PPM magnesium and/or calcium. Such a design of separating module 300 from module 500 may allow for greater flexibility in design of an extraction system for various locations.

In an aspect of the present disclosure, a different module 300 having output 328 may be employed in a particular location and/or application. Output 328 may be a concentrated output of a desired constituent that is relatively free from impurities. For example, and not by way of limitation, output 328 may be a 40 wt % lithium output with less than 5 PPM of impurities present.

Again, such an output 328 may be impractical and/or cost prohibitive to transport. As such, module 504, which may also be referred to as a "post-processing module" herein, may be coupled to output 328 to produce a more "final" product from output 328. Such a final output 506 may be, for example, a lithium carbonate solution, a lithium hydroxide monohydrate solution, and/or other outputs depending on the desired constituent in output 328 and the desired output 506.

Similarly, output 324, which comprises one or more impurities from brine input stream 312, may be coupled to module 508. Module 508, which also may be referred to as a "post-processing module" herein, may separate one or more impurities from the output 324 and provide that separated impurity in output 510, with the remaining impurities from output 324 provided at output 512.

With the modular design shown in FIG. 5, it can be seen that a system in accordance with an aspect of the present disclosure can provide a complete processing system that accepts the brine input stream 312 and can produce various outputs 320, 324, 328, 502, 506, 510, and/or 512, as well as other outputs, depending at least in part on the constituents in the brine input stream 312, the location where the system will be placed, and/or other factors as desired. Dotted lines shown in FIG. 5 also show that a system can have different interconnections to allow for even further adaptability between modules 300, 400, 500, 504, and/or 508.

For a firmware and/or software implementation of the present disclosure, such as with respect to the processor 332, the methodologies described may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Although the present disclosure and its advantages have been described in detail, it should be understood that various changes, substitutions and alterations can be made herein without departing from the technology of the disclosure as defined by the appended claims. For example, relational terms, such as "above" and "below" and/or "inside" and "outside" are used with respect to a specific device. Of course, if the device is inverted, above becomes below, and vice versa. Additionally, if oriented sideways, above and below may refer to sides of a device.

Further, reference to "first" or "second" instances of a feature, element, or device does not indicate that one device comes before or after the other listed device. Reference to first and/or second devices merely serves to distinguish one device that may be similar or similarly referenced with respect to another device.

Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

The description of the disclosure is provided to enable any person skilled in the art to make or use the disclosure. Various modifications to the disclosure will be readily apparent to those reasonably skilled in the art, and the generic principles defined herein may be applied to other variations without departing from the spirit or scope of the disclosure. Thus, the present disclosure is not intended to be limited to the examples and designs described herein but is to be accorded the widest scope consistent with the principles and novel features disclosed herein. Accordingly, the disclosure is not to be limited by the examples presented herein, but is envisioned as encompassing the scope described in the appended claims and the full range of equivalents of the appended claims.

What is claimed is:

1. A method comprising:
   accessing a brine input stream and a dilute stream;
   selectively directing the brine input stream to a tank of a modular extraction system;
   extracting, by a sorbent material contained within the tank, a constituent from the brine input stream;
   selectively directing the dilute stream through at least a portion of a length of the tank to expose the dilute stream to the sorbent material, wherein the tank is configured to provide a substantially sharp concentration profile between the brine input stream and the dilute stream that is flowed through the at least a portion of the length the tank; and
   processing, by a concentration membrane of the modular extraction system, the extracted constituent into an output stream, wherein the tank and the concentration membrane are sized such that the modular extraction system is mobile.

2. The method of claim 1, wherein the tank is part of a modular extraction system.

3. The method of claim 2, wherein the at least one tank and the concentration membrane are sized such that the modular extraction system is mobile.

4. The method of claim 1, wherein the tank is configured to maintain a substantially constant pressure within the at least one tank.

5. The method of claim 4, wherein the tank is sized such that the tank maintains the substantially constant pressure within the tank.

6. The method of claim 1, wherein the tank is sized such that the at least one tank creates the substantially sharp concentration profile between the brine input stream and the dilute stream that is presented to the sorbent material and travels along the at least a portion of the length of the at least one tank.

7. The method of claim 1, wherein the sorbent material comprises a solid material.

8. The method of claim 1, wherein the sorbent material comprises lithium aluminate, aluminum-based materials, aluminum-oxygen based materials, manganese, manganese oxides, gallium-based materials, cobalt oxides, transition metal oxides, transition metal sulfides, transition metal phosphates, aluminum phosphates, gallium phosphates, antimony oxides, antimony phosphates, tin oxides, tin phosphates, silicon-based materials, germanium-based materials, transition metal silicates, aluminum-gallium silicates, germanium, tin, antimony silicates, sulfides, titanates, indiumates, indium tin oxides, mixed transition metal oxides, phosphates, organophosphates, polymers containing organophosphates, polyethers, ion-exchange resins, bohemite-based materials, aluminum-oxyhydroxides, activated alumina, or a combination thereof.

9. The method of claim 1, wherein the tank is part of an array of tanks, the method further comprising selectively directing the brine input stream and the dilute stream to tanks within the array of tanks.

10. The method of claim 9, wherein the brine input stream and the dilute stream are selectively directed to the tanks within the array of tanks through one or more valves.

11. The method of claim 9, wherein the array of tanks comprises a first tank and a second tank and the method further comprises sequentially controlling delivery of the brine input stream to the first tank and then the second tank after the brine input stream passes through the first tank.

12. The method of claim 9, wherein the array of tanks is arranged on a mobile unit.

13. The method of claim 9, wherein the tanks in the array of tanks each have a diameter ranging from 0.5 feet to 2 feet and a height ranging from 1 foot to 20 feet.

14. The method of claim 1, wherein the constituent comprises lithium.

15. The method of claim 1, further comprising: processing, by a purification membrane, the extracted constituent into the output stream.

16. The method of claim 15, wherein the purification membrane is a solvent extraction system.

17. The method of claim 15, wherein the purification membrane is an evaporation system.

18. The method of claim 1, wherein the substantially sharp concentration profile occurs when a concentration of the least one constituent in the brine input stream remains separate and substantially evenly distributed along a physical boundary between the brine input stream and the dilute stream as the profile flows axially down the sorbent material in the tank.

19. A system comprising:
one or more processors; and
at least one computer-readable storage medium having stored therein instructions which, when executed by the one or more processors, cause the one or more processors to:
control access to a brine input stream and a dilute stream;
control flow of the brine input stream and the dilute stream through a tank of a modular extraction system, wherein the tank comprises a sorbent material configured to extract a constituent from the brine input stream; and
selectively direct the dilute stream through at least a portion of a length of the tank to expose the dilute stream to the sorbent material, wherein:
the tank is configured to provide a substantially sharp concentration profile between the brine input stream and the dilute stream that is flowed through the at least a portion of the length the tank;
the modular extraction system comprises a concentration membrane that is configured to extract the constituent into an output stream; and
the tank and the concentration membrane are sized such that the modular extraction system is mobile.

20. A non-transitory computer-readable storage medium storing instructions for causing one or more processors to:
control access to a brine input stream and a dilute stream;
control flow of the brine input stream and the dilute stream through a tank of a modular extraction system, wherein the tank comprises a sorbent material configured to extract a constituent from the brine input stream; and
selectively direct the dilute stream through at least a portion of a length of the tank to expose the dilute stream to the sorbent material, wherein:
the tank is configured to provide a substantially sharp concentration profile between the brine input stream and the dilute stream that is flowed through the at least a portion of the length the tank;
the modular extraction system comprises a concentration membrane that is configured to extract the constituent into an output stream; and
the tank and the concentration membrane are sized such that the modular extraction system is mobile.

* * * * *